United States Patent

Johannsen et al.

[15] 3,682,218
[45] Aug. 8, 1972

[54] EMERGENCY SUPPORTING RING FOR VEHICLE WHEELS WITH PNEUMATIC TIRES

[72] Inventors: Peter Johannsen; Robert Kohler; Gerhard Wedekind, all of Hannover, Germany

[73] Assignee: Continential Gummi-Werke Aktiengesellschaft, Hannover, Germany

[22] Filed: March 26, 1970

[21] Appl. No.: 22,914

[30] Foreign Application Priority Data

Feb. 3, 1970 Germany..........P 20 04 740.9
Feb. 11, 1970 Germany..........P 16 05 629.4

[52] U.S. Cl.................................................152/158
[51] Int. Cl..............................................B60c 17/04
[58] Field of Search.....................................152/158

[56] References Cited

UNITED STATES PATENTS 3,141,490  7/1964  Lindley.....................152/158

*Primary Examiner*—Arthur L. La Point
*Assistant Examiner*—George H. Libman
*Attorney*—Walter Becker

[57] ABSTRACT

An emergency supporting ring for vehicle wheels with pneumatic tires, which is arranged within the hollow chamber of the tire and is equipped with blocks of rubber material which blocks are uniformly distributed over the circumference of said emergency supporting ring, the total of the distance between each two adjacent blocks measured along the outer circumferential circle of the ring being greater than the difference between the circumferential circle of said ring and the inner tire circumference while the difference in the circumferential speed of said outer circumferential surface of said ring and the outer circumferential surface of the tire is compensated for by a shear deformation of the blocks, the spacing between two adjacent blocks being such that at the ground contacting area of the tire when the wheel is under the rated load of the tire is greater than the deformation stroke of the blocks during their shear deformation.

3 Claims, 4 Drawing Figures

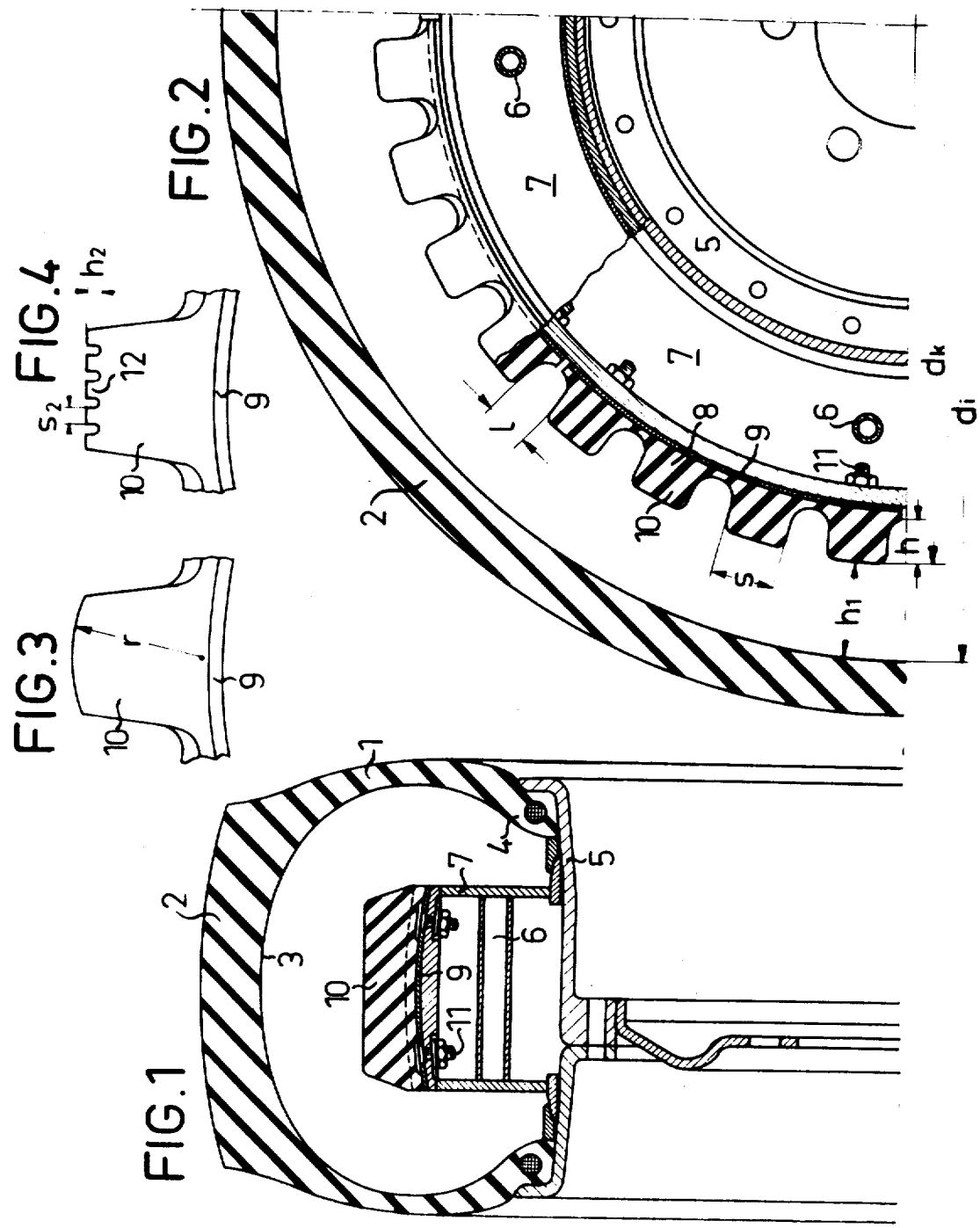

EMERGENCY SUPPORTING RING FOR VEHICLE WHEELS WITH PNEUMATIC TIRES

The present invention relates to an emergency supporting ring for vehicle wheels equipped with pneumatic tires, which ring is located in the hollow chamber of the tire and is provided with blocks or ribs of rubber or rubber-like materials uniformly or approximately uniformly distributed over the circumference of the ring. The purpose of such an emergency supporting ring consists in taking over the load of the wheel when the pneumatic tire is damaged from the outside, for instance, by mechanical means.

Inasmuch as during normal driving operation a spring action of the wheel should bring about a corresponding depression of the pneumatic tire, the outer diameter or crown circle diameter of the emergency supporting ring must be considerably smaller than the inner diameter of the pneumatic tire below the tread strip. In view of this considerable difference in diameter, corresponding differences in the circumference are obtained, and in case of a deflation of the tire, also differences in the frictional road contacting circumferential extensions result which bring about a corresponding slip and a corresponding great wear at the ground contacting areas between the pneumatic tire and the emergency supporting ring.

It is, therefore, an object of the present invention so to design the emergency supporting ring of the above described type that within the area of the ground contacting region between the emergency supporting ring and the pneumatic tire a slip will practically be eliminated or will approximately be eliminated. This object and other objects and advantages of the invention will appear more clearly from the following specification in connection with the accompanying drawing, in which:

FIG. 1 diagrammatically illustrates a radial section through a portion of a wheel according to the invention for a truck.

FIG. 2 is a portion of a longitudinal section through a wheel according to FIG. 1.

FIG. 3 and 4 respectively illustrate two different types of blocks or ribs for an emergency supporting ring according to the invention.

The emergency supporting ring according to the present invention is characterized primarily in that the total of the distances between the blocks at the diameter of the crown circle of the emergency supporting ring is greater than the difference in the circumference between the crown circle diameter and the tire inner diameter so that the circumferential speed difference inherent to the crown circle diameter and the inner diameter of the tire can be equalized by a shear deformation of the blocks, the distance between adjacent blocks being such that at the ground contacting area under the wheel load (rated load) there remains between the circumferentially adjacent blocks a distance which is in excess of the deformation of the blocks during the shear deformation.

With an emergency supporting ring designed in this way, the resiliency of the emergency supporting ring under load will be assured at the ground contacting area. In addition thereto, in view of the above mentioned distances between adjacent or successive blocks, it will be assured that the blocks can deform in conformity with the differences in diameter without interfering with each other, and can do so even when the blocks at the ground contacting area are subjected to pressure in view of the wheel load.

Referring now to the drawing in detail, the pneumatic tire 1 with the tread strip zone 2 and the surface 3 therebelow on the inner circumference of the tire 1 is by means of its beads 4 mounted on a flat bed rim 5. Between the two beads 4 there is provided a rigid annular body 6 with lateral discs 7 which rest against the flat bed rim 5. The annular body 6 is centered and is centrally and frictionally held between the two beads 4 by bracing in axial direction.

The outer surface of the annular body 6 may be cylindrical or crowned and serves for rigidly connecting thereto segments 8 which consist of a metallic base plate 9 and blocks or ribs 10 firmly connected thereto. The base plate 9 is held on the annular body 6 by means of screws 11.

The blocks or ribs 10 which at their roots merge with each other consist of rubber or rubber-like synthetic materials which will be contacted by the inner surface 3 of the pneumatic tire 1 when the latter has become deflated or pressure-less due to mechanical influences.

The rubber blocks 10 extend transversely to the circumferential direction of the vehicle wheel, the arrangement being such that the sum of the distances between the blocks at the crown circle diameter $d_k$ is greater than the circumferential difference between the inner circumference of the tire 1 as determined by the diameter $d_i$ and the crown circle circumference as determined by the diameter $d_k$ of the crown circle. Furthermore, the blocks 10 are relatively compact. If the inner surface 3 of the tire rests on the outer surface of the blocks 10, the blocks 10 will be subjected to a deformation by pressure without, however, being bent or buckled by the deforming pressure. The differences in the circumference are in this instance equalized by a shear deformation of the blocks 10.

The above mentioned requirements are best met when the ratio of the gap width $l$ to the width $s$ of the blocks or ribs 10 amounts to five to eight times the ratio of $h_1 : d_k$. Furthermore, preferably the ratio of the freely deformable height $h$ of the rubber blocks to the width $s$ of the blocks 10 should be from 0.7 to 1.1 : 1. Such dimensions will, when driving with deflated tire, assure the least development of heat and thus maximum durability. At the same time there also exists the possibility to transfer the driving force even when the tire itself has been destroyed and can no longer carry out this task.

According to the present invention, also the head of the blocks 10 may be shaped in a special way in order to reduce the rolling resistance of the pressure-less tire and to reduce the friction work which during the driving is transformed into heat. To this end, the surface of the blocks 10 may, as illustrated in FIG. 4, be divided into smaller blocks 12 the height $h_2$ of which should have a relationship to the height $h$ of the blocks which equals the ratio of about 1 : 5 to 1 : 8. Furthermore, the head of the blocks 10 may, in conformity with FIG. 3, also be rounded. In this connection it is advantageous to have the relationship $2 r/d_k = (0.1 \ldots 0.13)/1$.

Moreover, it is expedient to provide approximately from 30 to 60 blocks 10 over the circumference of the emergency supporting ring when a medium size truck tire is involved.

By designing the blocks 10 in the above outlined manner, a thrust deformation of each block will be possible inasmuch as the block surfaces at the outer circumference of the emergency supporting ring are displaced elastically and substantially parallel to the base plate 9. Moreover, the width *l* of the gap has been so selected that also then the respective adjacent surfaces 13 of circumferentially successive blocks 10 do not contact each other when the pneumatic tire is damaged and when the blocks 10 at the ground contacting area are subjected to pressure. The comparatively great gap width *l* thus takes into consideration the pressure deformation of the blocks 10 and the the desired thrust deformation. Neither thrust deformation nor the pressure deformation will thus be able to close the gaps between adjacent blocks 10.

It is, of course, to be understood that the present invention is, by no means, limited to the particular structure shown in the drawing but also comprises any modifications within the scope of the appended claims.

What we claim is:

1. A vehicle wheel which includes: a rim, a pneumatic tire mounted on said rim, and an emergency supporting ring member arranged radially inwardly of and in spaced relationship to said pneumatic tire and supported by said rim, said ring member including a plurality of block means forming the outer circumferential portion of said ring member and defining recesses therebetween of approximately identical magnitude so as to space radially outer portions of said block means from each other, the total of the width of all of said recesses measured along the outer circumferential circle of said emergency ring member being greater than the difference between the inner circumferential circle of the tire in inflated condition and the outer circumferential circle of said emergency ring member, said block means being adapted to undergo a shear deformation for compensating for the difference in the circumferential speed of said ring member and said tire in deflated condition of the latter, the distance between adjacent block means in inflated condition of the tire being such that in deflated condition of the tire and with the rated wheel load acting upon said ring member the distance between adjacent block means in the circumferential direction of said ring member and within the ground contacting region of the tire being greater than the deformation stroke of the respective block means during their shear deformation, the outer circumferential surface of said block means being provided with blocks.

2. A vehicle wheel according to claim 1, in which the ratio of the freely deformable height of the block means to the height of said blocks is within the range of from 5 : 1 to 8 : 1.

3. A vehicle tire which includes: a rim, a pneumatic tire mounted on said rim, and an emergency supporting ring member arranged radially inwardly of and in spaced relationship to said pneumatic tire and supported by said rim, said ring member including a plurality of block means forming the outer circumferential portion of said ring member and defining recesses therebetween of approximately identical magnitude so as to space redailly outer portions of said block means from each other, the total of the width of all of said recesses measured along the outer circumferential circle of said emergency ring member being greater than the difference between the inner circumferential circle of the tire in inflated condition and the outer circumferential circle of said emergency ring member, said block means being adapted to undergo a shear deformation for compensating for the difference in the circumferential speed of said ring member and said tire in the deflated condition of the latter, the distance between adjacent block means in inflated condition of the tire being such that in deflated condition of the tire and with the rated wheel load acting upon said ring member the distance between adjacent block means in the circumferential direction of said ring member and within the ground contacting region of the tire being greater than the deformation stroke of the respective block means during their shear deformation, the circumferential surface of said block means being rounded in the circumferential direction of said ring member, and the ratio of the rounding radius to the outer circumferential diameter of said ring member being within the range of from 0.1 to 0.13 : 1.

* * * * *